United States Patent
Kim et al.

(10) Patent No.: US 8,385,968 B2
(45) Date of Patent: Feb. 26, 2013

(54) PRECODING METHOD AND APPARATUS, AND PRECODING CONTROL METHOD AND APPARATUS

(75) Inventors: Jihyung Kim, Daejeon (KR); Wooram Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 458 days.

(21) Appl. No.: 12/787,088

(22) Filed: May 25, 2010

(65) Prior Publication Data
US 2011/0065465 A1 Mar. 17, 2011

(30) Foreign Application Priority Data
Sep. 17, 2009 (KR) .................. 10-2009-0088236
May 24, 2010 (KR) .................. 10-2010-0048065

(51) Int. Cl.
*H04B 7/00* (2006.01)
(52) U.S. Cl. ............... 455/522; 455/69; 375/240.22; 370/479
(58) Field of Classification Search .......... 455/522, 455/67.11, 68–70, 126; 375/340, 240.22; 370/479
See application file for complete search history.

(56) References Cited

U.S. PATENT DOCUMENTS

| | | | |
|---|---|---|---|
| 8,160,125 B2 * | 4/2012 | Clerckx et al. | 375/219 |
| 2005/0034050 A1 * | 2/2005 | Das et al. | 714/758 |
| 2008/0128501 A1 * | 6/2008 | Thebault et al. | 235/454 |
| 2009/0247175 A1 * | 10/2009 | van Rensburg et al. | 455/450 |
| 2011/0002263 A1 * | 1/2011 | Zhu et al. | 370/328 |

OTHER PUBLICATIONS

Part 16: Air Interface for Fixed and Mobile Broadband Wireless Access Systems, Draft Amendment to IEEE Standard for Local and Metropolitan Area Networks, IEEE P802.16m/D5, Apr. 7, 2010.
Wookbong Lee, et al., "Text Change Proposal for UL Multi-BS MIMO Section (15.5.2)", IEEE C802.16m-09/2389, Nov. 6, 2009.
Wooram Shin, et al., "Proposed Text Changes for the UL Single BS Precoding with Multi-BS Coordination (16.2.3, 16.2.3.47, 16.5.2.1)", IEEE C802.16m-10/0228r4, Mar. 5, 2010.
Wooram Shin, et al., "Proposed Text Changes for the UL Single BS Precoding with Multi-BS Coordination (16.2.3, 16.2.3.47, 16.5.2.1)", IEEE C802.16m-10/0532, Apr. 30, 2010.

* cited by examiner

*Primary Examiner* — Dominic E Rego
(74) *Attorney, Agent, or Firm* — Staas & Halsey LLP (57) ABSTRACT

To control precoding of a terminal in a serving base station, a first codeword that maximizes transmission power of the serving base station is determined by a codebook, and an index of a second codeword that minimizes interference to the neighboring base station is transmitted from the neighboring base station. The serving base station transmits an index of the first codeword, an index of the second codeword, and a combination ratio of a precoding matrix corresponding to the index of the first codeword and a precoding matrix corresponding to the index of the second codeword to the terminal.

17 Claims, 6 Drawing Sheets

PRECODING METHOD AND APPARATUS, AND PRECODING CONTROL METHOD AND APPARATUS

CROSS-REFERENCE TO RELATED APPLICATION

This application claims priority to and the benefit of Korean Patent Application Nos. 10-2009-0088236 filed in the Korean Intellectual Property Office on Sep. 17, 2009 and 10-2010-0048065 filed in the Korean Intellectual Property Office on May 24, 2010, the entire contents of which are incorporated herein by reference.

BACKGROUND OF THE INVENTION (a) Field of the Invention

The present invention relates to a precoding apparatus and method, and a precoding control apparatus and method in a communication system.

(b) Description of the Related Art

Among communication systems, a multi-input multi-output (MIMO) communication system uses antennas that enable multi-input and multi-output. A base station and/or a terminal transmit data through multiple paths by using multiple antennas and detect signals received through multiple paths.

A direction for transmitting data can be controlled if a beam is formed according to a precoding matrix when the multiple antennas are used. However, the formed beam may cause inter-cell interference.

SUMMARY OF THE INVENTION

An aspect of the present invention provides a precoding method and apparatus, and a precoding control method and apparatus for reducing inter-cell interference.

According to an embodiment of the present invention, a method of controlling precoding of a terminal in a serving base station is provided.

The method includes determining a first codeword that maximizes transmission power in a codebook, receiving an index of a second codeword that minimizes interference to a neighboring base station from the neighboring base station, and transmitting an index of the first codeword, the index of the second codeword, and a combination ratio of a precoding matrix corresponding to the index of the first codeword and a precoding matrix corresponding to the index of the second codeword to the terminal.

According to another embodiment of the present invention, a precoding method in a terminal is provided.

The precoding method includes receiving, from a serving base station, an index of a first codeword that maximizes transmission power of a serving base station, an index of a second codeword that minimizes interference to a neighboring base station, and a combination ratio of a first precoding matrix corresponding to the index of the first codeword and a second precoding matrix corresponding to the index of the second codeword, and generating a transmission precoding matrix by combining the first precoding matrix and the second precoding matrix according to the combination ratio.

According to another embodiment of the present invention, a precoding control apparatus of a serving base station is provided. The precoding control apparatus includes a neighboring base station cooperation unit, a precoding control unit, and a transceiver. The neighboring base station cooperation unit receives an index of a first codeword from a neighboring base station. The precoding control unit determines the combination ratio of a precoding matrix corresponding to an index of a second codeword and the index of the first codeword, and a precoding matrix corresponding to the index of the second codeword. The transceiver transmits the index of the first codeword, the index of the second codeword, and the combination ratio to the terminal. The first codeword is a codeword that maximizes a norm of each codeword and a channel between the serving base station and the terminal in the codebook, and the second codeword is a codeword that minimizes a norm of each codeword and the channel between the serving base station and the terminal in the codebook.

According to yet another embodiment of the present invention, a precoding apparatus of a terminal including a transceiver and a precoding unit is provided. The transceiver receives an index of a first codeword, an index of a second codeword, and a combination ratio of a first precoding matrix corresponding to the index of the first codeword and a second precoding matrix corresponding to the index of the first codeword from a serving base station. The precoding unit generates a transmission precoding matrix by combining the first precoding matrix and the second precoding matrix and. The first codeword is a codeword that maximizes a norm of each codeword and a channel between the serving base station and the terminal in the codebook, and the second codeword is a codeword that minimizes a norm of each codeword and the channel between the serving base station and the terminal in the codebook.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the following description, the term terminal may designate a mobile station (MS), a mobile terminal (MT), a subscriber station (SS), a portable subscriber station (PSS), user equipment (UE), an access terminal (AT), and so on, and may include all or some function thereof.

Further, the term base station (BS) may designate an access point (AP), a radio access station (RAS), a nodeB, an evolved nodeB (eNodeB), a base transceiver station (BTS), an MMR (mobile multihop relay)-BS, and so on, and may include all or some functions thereof.

Hereinafter, a precoding method and apparatus and a precoding control method and apparatus according to an embodiment of the present invention will be described with reference to the accompanying drawings.

Figure 1:
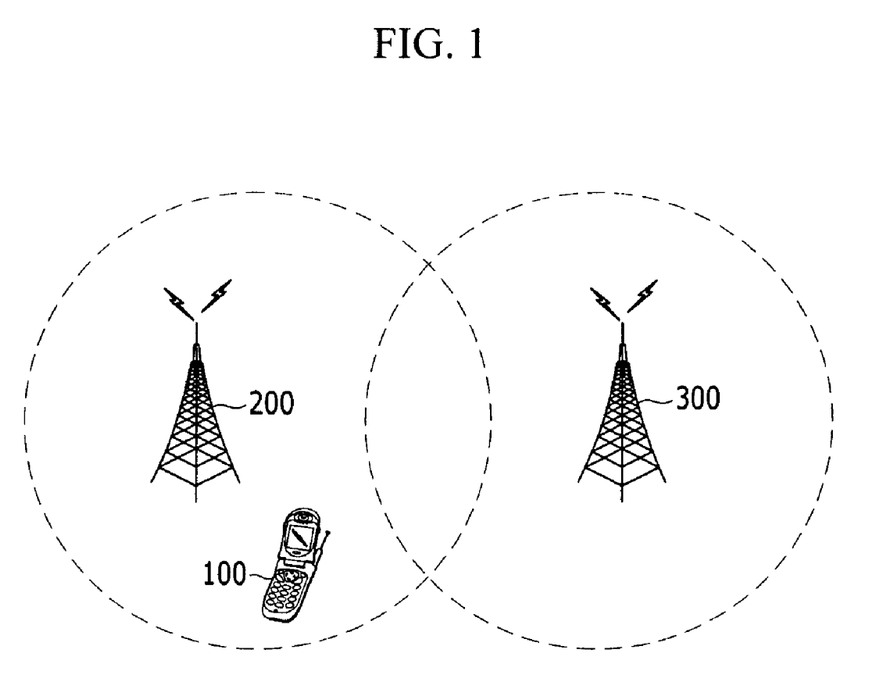
FIG. 1 is a schematic diagram showing a communication system according to an embodiment of the present invention.

FIG. 1 is a schematic diagram showing a communication system according to an embodiment of the present invention.

Referring to FIG. 1, the wireless communication system includes a terminal 100, a serving base station 200, and a neighboring base station 300.

The serving base station 200 determines information for precoding a matrix combination in cooperation with the neighboring base station 300, and transmits the information to the terminal 100. The neighboring base station 300 provides information that is necessary to determine the information for the precoding matrix combination to the serving base station 200.

The terminal 100 generates a transmission precoding matrix based on the information for the precoding matrix combination, and performs uplink transmission using the transmission precoding matrix.

Figure 2:
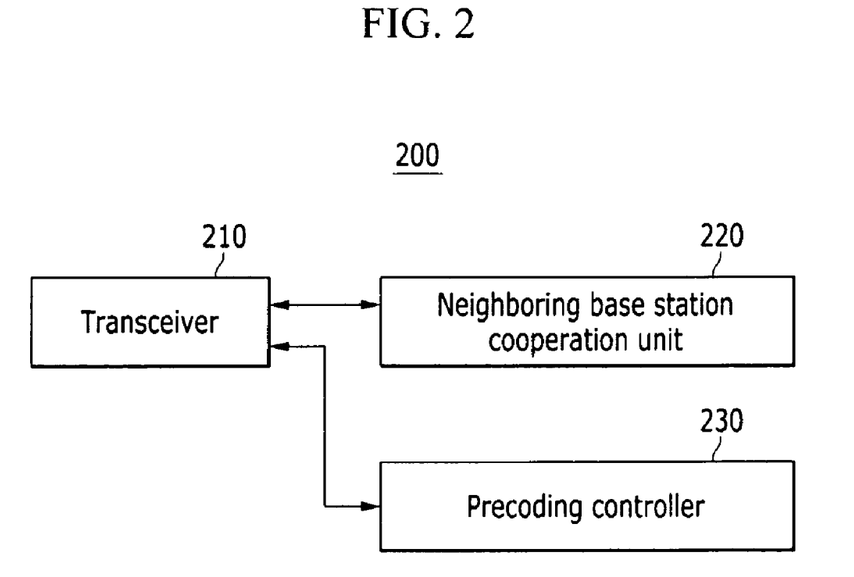
FIG. 2 is a schematic block diagram showing a precoding control apparatus of a serving base station.
Figure 3:
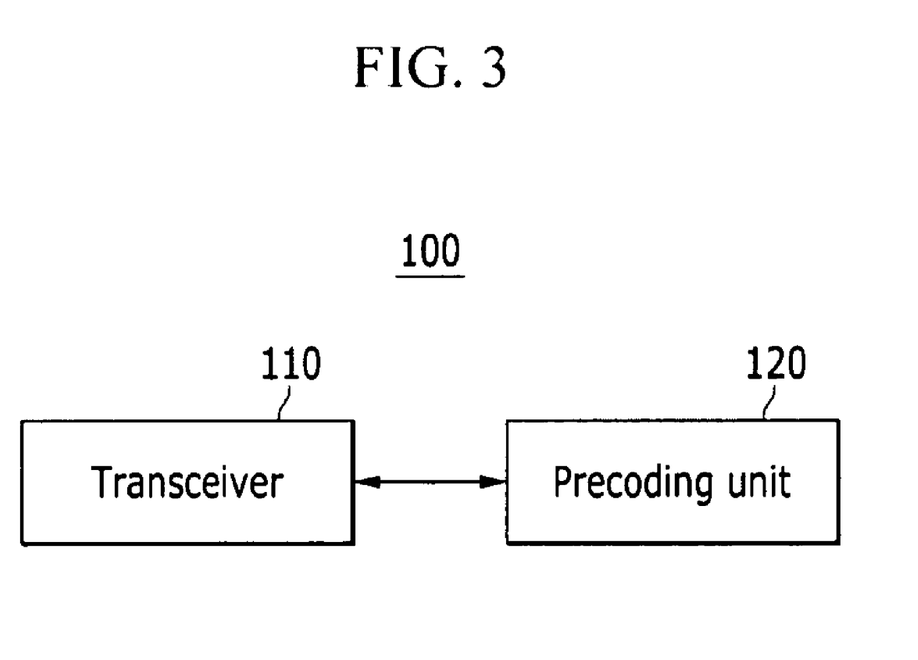
FIG. 3 is a schematic block diagram showing a precoding control apparatus of a terminal.

FIG. 2 is a schematic block diagram showing a precoding control apparatus of a serving base station, and FIG. 3 is a schematic block diagram showing a precoding apparatus of a terminal.

Referring to FIG. 2, the precoding control apparatus of the serving base station 200 includes a transceiver 210, a neighboring base station cooperation unit 220, and a precoding controller 230.

The transceiver 210 receives a sounding signal from the terminal 100. The neighboring base station cooperation unit 200 receives precoding matrix information that is used for combining a precoding matrix from the neighboring base station 300. The precoding controller 230 estimates a channel between the terminal 100 and the serving base station 200 based on the sounding signal, and determines information on the precoding matrix used for the precoding matrix combination according to the estimated channel. In addition, the precoding controller 230 determines a combination ratio of the precoding matrix determined by the neighboring base station 300 and the precoding matrix determined by itself. The transceiver 210 transmits information on the precoding matrix determined by the neighboring base station 300, information on the precoding matrix determined by itself, and the combination ratio.

Referring to FIG. 3, the precoding apparatus of the terminal 100 includes a transceiver 110 and a precoding unit 120.

The transceiver 110 receives the information on two precoding matrices and the combination ratio from the serving base station 200. The precoding unit 120 combines the precoding matrices corresponding to the information on the two precoding matrices according to the combination ratio, and generates a transmission precoding matrix. The transceiver 110 transmits uplink data according to the transmission precoding matrix.

Hereinafter, a beamforming method according to an embodiment of the present invention will be described with reference to FIG. 4.

Figure 4:
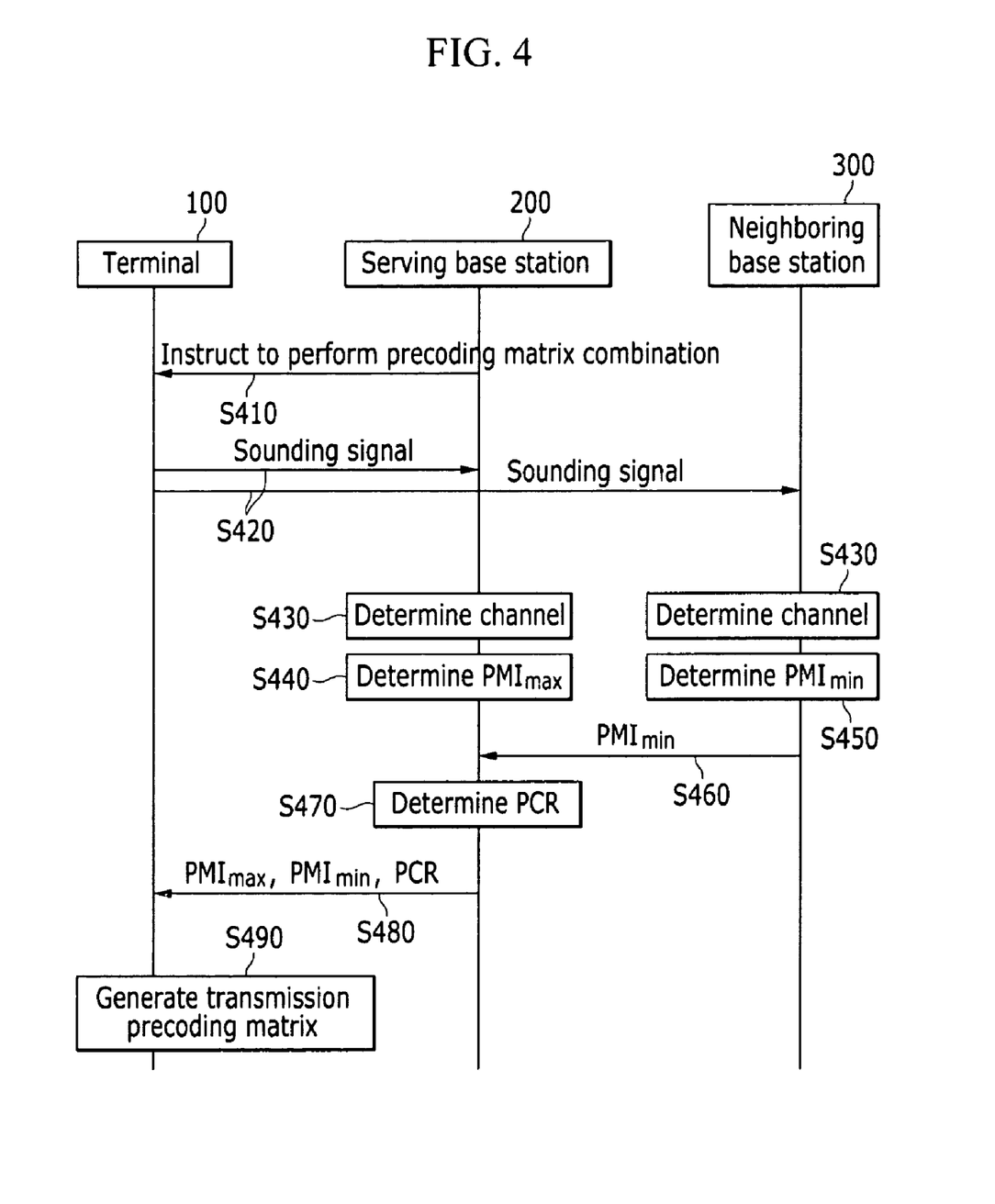
FIG. 4 is a flowchart showing a beamforming method according to an embodiment of the present invention.

FIG. 4 is a flowchart showing a beamforming method according to an embodiment of the present invention.

Referring to FIG. 4, a serving base station 200 instructs the terminal 100 to combine precoding matrices (S410).

The terminal 100 transmits a sounding signal, and the serving base station 200 and a neighboring base station 300 receive the sounding signal transmitted from the terminal 100 (S420). The serving base station 200 and the neighboring base station 300 estimate channels $H_S$ and $H_I$ formed with respect to the terminal 100 (S430).

The serving base station 200 determines an index of a codeword that maximizes transmission power of the serving base station 200 from a plurality of codewords included in a codebook as a maximum precoding matrix index (PMI) $PMI_{max}$ (S440). The serving base station 200 may determine an index i of the codeword $v_i$ that maximizes a norm between the codeword $v_i$ and the channel $H_S$ formed between the terminal 100 and the serving base station 200 as the maximum PMI $PMI_{max}$ as expressed in Equation 1. The neighboring base station 300 determines an index of a codeword that minimizes interference among the plurality of codewords included in the codebook as a minimum PMI $PMI_{min}$ as expressed in Equation 2 (S450). The neighboring base station 300 may determine an index i of the codeword $v_i$ that minimizes a norm between the codeword $v_i$ and a channel formed between the terminal 100 and the neighboring base station 300 as the minimum PMI $PMI_{min}$. The neighboring base station 300 transmits the determined minimum PMI $PMI_{min}$ to the serving base station 200 (S460). In this case, the neighboring base station 300 transmits the minimum PMI $PMI_{min}$ to the serving base station 200 through a backhaul network.

$$PMI_{max} = \underset{i}{\arg\max} \|H_s v_i\|^2 \quad (1)$$

$$PMI_{min} = \underset{i}{\arg\min} \|H_I v_i\|^2 \quad (2)$$

The serving base station determines a combination ratio (hereinafter referred to as "PMI combination ratio") PCR of a precoding matrix $W_{PMImax}$ corresponding to the maximum PMI $PMI_{max}$ and a precoding matrix $W_{PMImin}$ corresponding to the minimum PMI $PMI_{min}$ (S470), and transmits the PMI combination ratio PCR, the maximum PMI $PMI_{max}$, and the minimum PMI $PMI_{min}$ to the terminal 100 (S480).

The terminal 100 generates the transmission precoding matrix W through combining the precoding matrix $W_{PMImax}$ corresponding to the maximum PMI $PMI_{max}$ and the precoding matrix $W_{PMImin}$ corresponding to the minimum PMI $W_{PMImin}$ according to the PMI ratio PCR (S490). For example, the terminal 100 may generates the transmission precoding matrix W as expressed in Equation 3. Then, the terminal 100 transmits uplink data to the serving base station 100 according to the transmission precoding matrix W.

$$W = \frac{PCR \cdot W_{PMImax} + (1 - PCR) \cdot W_{PMImin}}{\|PCR \cdot W_{PMImax} + (1 - PCR) \cdot W_{PMImin}\|}, \quad 0 \le PCR \le 1 \quad (3)$$

As described above, according to an embodiment of the present invention, the precoding matrix that can maximize the transmission power between the terminal 100 and the serving base station 200 and the precoding matrix that can minimize the interference to the neighboring base station 300 may be simultaneously utilized, and thus the inter-cell interference in uplink transmission can be reduced. Further, since the serving base station 200, which directly receives the effect of the neighboring cells in the uplink transmission, determines the PMI combination ratio of the two precoding to matrices, the inter-cell interference can be more reduced than the case when the terminal that cannot determine the effect of the neighboring cells determines the PMI combination ratio.

Hereafter, the method to determine the terminal that utilizes the precoding matrix combination at the serving base station 200 will be described with reference to FIG. 5 and FIG. 6.

Figure 5:
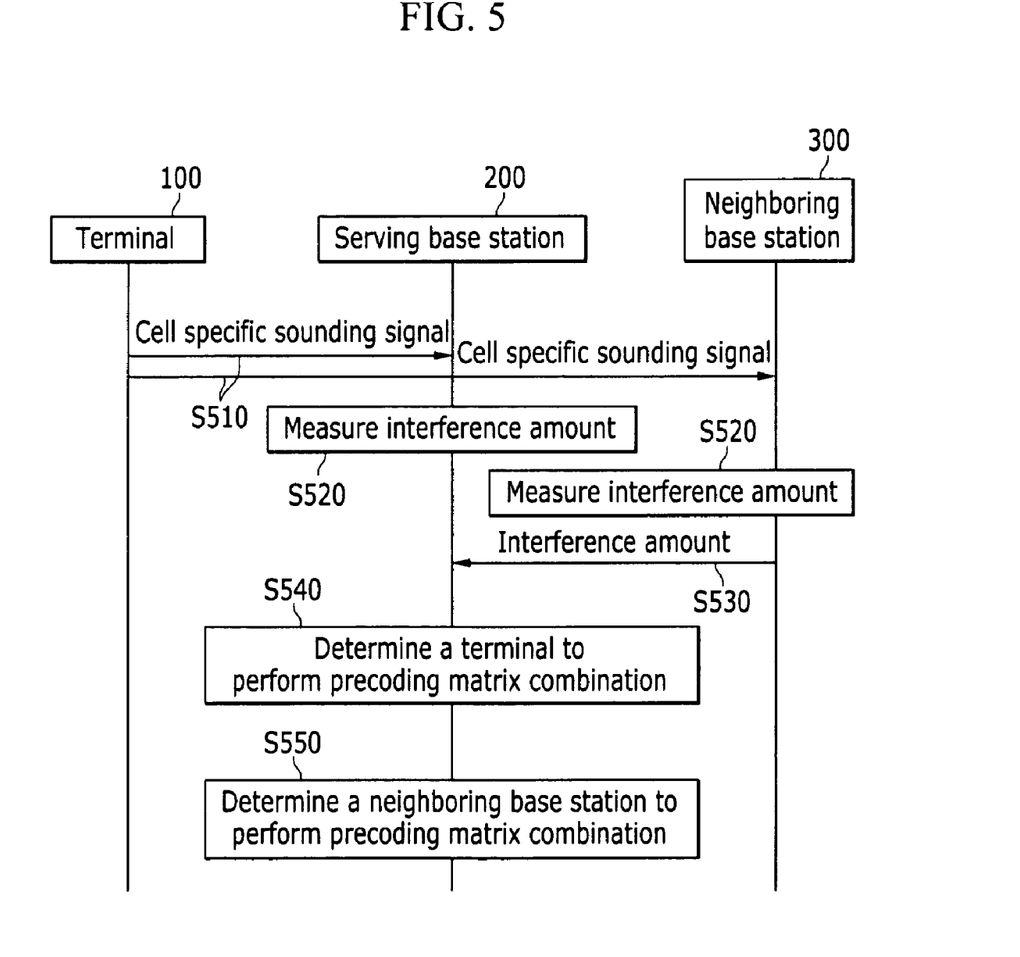
FIG. 5 and FIG. 6 are schematic flowcharts showing a method to determine a terminal for combining precoding matrices according to an embodiment of the present invention, respectively.
Figure 6:
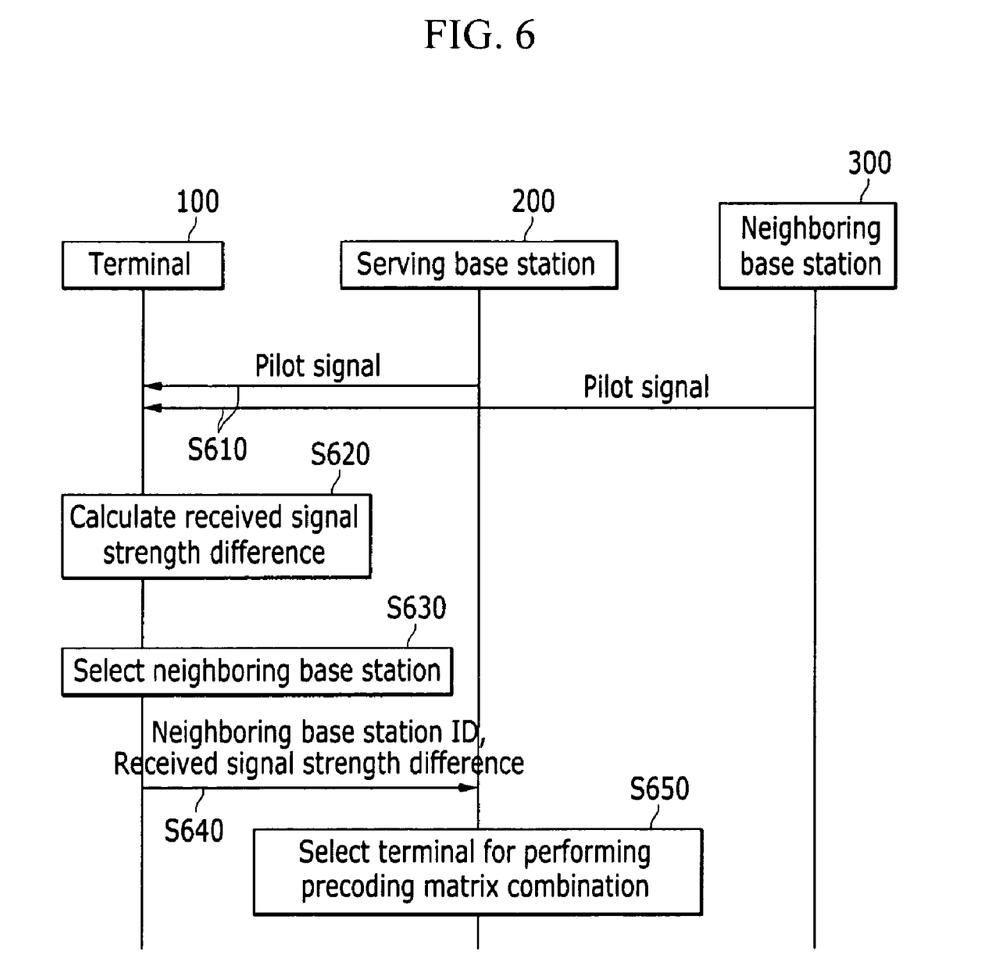

FIG. 5 and FIG. 6 are schematic flowcharts showing a method to determine a terminal for combining precoding matrices according to an embodiment of the present invention, respectively.

Referring to FIG. 5, a serving base station 200 instructs a terminal 100 to combine precoding matrices, and the terminal 100 transmits a cell specific sounding signal with the same sub-band as a frequency sub-band allocated to a sub-frame that sends a sounding signal (S510). In this case, the terminal 100 may generate the cell specific sounding signal from a sounding signal that utilizes the cyclic shift, frequency decimation, time separation, and the like according to a cell identifier ID.

The serving base station 200 measures an interference amount of each logical resource unit (LRU) or each sub-band according to the cell specific sounding signal (S520), and transmits the measured interference amount to a plurality of neighboring base stations (S530). Similarly, a neighboring base station transmits an interference amount that it measures to the serving base station and the other neighboring base station (S520, S530). The interference amount may be interference over thermal noise (IoT) and the like.

The serving base station 200 selects a predetermined number of terminals in which the interference amount of each LRU or each sub-band exceeds a reference value, as the terminals 100 that perform the precoding matrix combination (S540). Further, the serving base station 200 determines, for each of selected terminals, the neighboring base station having the greatest interference amount as a neighboring base station that determines the minimum PMI (S550).

The serving base station 200 instructs the selected terminals 100 to use the sounding signal. Here, the sounding signal may be set for each base station to differentiate a channel of a terminal covered by the neighboring cell from a channel of a terminal covered by its own cell. To this end, the terminal 200 may send a user specific sounding signal in the corresponding sub-frame. For example, the sounding signal may be set to differentiate the terminals of 4 cells per sub-frame and to differentiate antennas per frame.

Then, as described above referring to FIG. 4, the terminal 100 transmits the sounding signal (S420 in FIG. 4). The serving base station 200 and the neighboring base station 300 measure the channels related to the terminal based on the received sounding signal, and transmit the measured channels to the neighboring base station (S430 in FIG. 4). In this case, each base station may measure channels of all bands in the corresponding terminal.

Meanwhile, referring to FIG. 6, differently from as shown in FIG. 5, the terminal 100 receives a pilot signal such as a preamble or a midamble from the serving base station 200 and a plurality of neighboring base stations (S610). The terminal 100 calculates a difference (hereinafter referred to as "received signal strength difference") between the strength of a signal received from the serving base station 200 and the strength of a signal received from each neighboring base station, by using the pilot signal (S620). The terminal 100 selects one neighboring base station that has the minimum received signal strength difference among the neighboring base stations that have the received signal strength difference below a reference value (S630), and transmits an ID of the selected neighboring base station 300 and the received signal strength difference to the serving base station 200 (S640).

The serving base station 200 selects a predetermined number of terminals that have much influence based on the received signal strength difference as the terminals that perform the precoding matrix combination (S650), and instructs the selected terminals 100 to utilize the sounding signal. For example, the serving base station 200 may select a predetermined number of terminals that have a small received signal strength difference as terminals that perform the precoding matrix combination.

Hereinafter, a message or a parameter used for the precoding method and apparatus and precoding control method and apparatus according to an embodiment of the present invention will be described referring to Table 1 to Table 3.

Table 1 represents a definition of parameters provided to the terminal by a serving base station according to an embodiment of the present invention, Table 2 represents a format of AAI_UL_MultiBS_MIMO_SBP message, and Table 3 represents a definition of AAI_UL_MultiBS_MIMO_SBP message among MAC control messages.

TABLE 1

| Parameter | Value | Control channel (information element) | Note |
|---|---|---|---|
| $PMI_{min}$ | 4 bit, when $N_t = 2$<br>6 bit, when $N_t = 4$ | AAI_UL_MultiBS_MIMO_SBP | Selected from Rank-1 base code |
| PCR | 0b00: 0.125<br>0b01: 0.375<br>0b10: 0.625<br>0b11: 0.875 | AAI_UL_MultiBS_MIMO_SBP | |

TABLE 2

| Name | Length (bits) | Description |
|---|---|---|
| AAI_UL_MultiBS_MIMO_SBP_Message_Format<br>{<br>Control Message Type = xx<br>$PMI_{min}$ | 4 to 6 | PMI from the Rank-1 base codebook that generates minimum interference to the neighboring base station |
| PCR<br>} | 2 | PMI combination ratio |

TABLE 3

| Message name | Message description | Security | Connection |
|---|---|---|---|
| ... | ... | ... | ... |
| AAI_UL_MultiBS_MIMO_SBP | Uplink multi-BS MIMO for single base station precoding with multi-BS coordination | NULL | Unicast |
| ... | ... | ... | ... |

Referring to Table 1 to Table 3, the serving base station may transmit the minimum PMI $PMI_{min}$ and the PMI combination ratio PCR through the AAI_UL_MultiBS_MIMO_SBP message among the MAC control messages. The minimum PMI $PMI_{min}$ may be 4 bits when the number $N_t$ of transmission antenna is 2 and 6 bits when $N_t$ is 4, and may be selected from a rank-1 base codebook. The PMI combination ratio (PCR) may be one of 0.125, 0.375, 0625, and 0.875.

As described above, according to an embodiment of the present invention, the inter-cell interference may be reduced by using the precoding matrix that maximizes the transmission power of the serving base station and the precoding matrix that minimizes the interference to the neighboring base station, and by determining the combination ratio of the two precoding matrices by the serving base station.

The above-mentioned embodiments of the present invention are not embodied only by a method and apparatus. Alternatively, the above-mentioned embodiments may be embodied by a program performing functions that correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling precoding of a terminal in a serving base station, the method comprising:
    determining a first codeword that maximizes transmission power in a codebook;
    receiving an index of a second codeword that minimizes interference to a neighboring base station from the neighboring base station; and
    transmitting an index of the first codeword, the index of the second codeword, and a combination ratio of a precoding matrix corresponding to the index of the first codeword and a precoding matrix corresponding to the index of the second codeword to the terminal.

2. The method of claim 1, further comprising receiving a sounding signal from the terminal,
    wherein determining the first codeword comprises
    calculating a channel between the serving base station and the terminal based on the sounding signal, and
    determining the first codeword based on the channel.

3. The method of claim 1, wherein the index of the first codeword is determined by $$\operatorname*{argmax}_{i} \|H_s v_i\|^2,$$

wherein the $H_S$ is a channel between the serving base station and the terminal, and the $v_i$ is a codeword having index i in the codebook.

4. The method of claim 1, wherein the index of the second codeword is determined by $$\operatorname*{argmin}_{i} \|H_I v_i\|^2,$$

wherein the $H_I$ is a channel between the neighboring base station and the terminal, and the $v_i$ is a codeword having index i in the codebook.

5. The method of claim 1, further comprising:
    receiving an interference amount of each terminal measured based on a cell specific sounding signal transmitted from a plurality of terminals from at least one neighboring base station;
    selecting a terminal having an interference amount that exceeds a reference value as a terminal for receiving the combination ratio among the plurality of terminals; and
    selecting a neighboring base station that has the maximum interference amount with regard to the selected terminal among at least one neighboring base station as a neighboring base station for receiving the index of the second codeword.

6. The method of claim 5, wherein the inference amount is measured for each sub-band or each logical resource unit.

7. The method of claim 1, further comprising:
    receiving, from a plurality of terminals, identification information of the neighboring base station and a received signal strength difference between the serving base station and the neighboring base station in each terminal; and
    selecting a terminal to receive the combination ratio among the plurality of terminals based on the received signal strength difference.

8. A precoding method in a terminal, comprising:
    receiving, from a serving base station, an index of a first codeword that maximizes transmission power of a serving base station, an index of a second codeword that minimizes interference to a neighboring base station, and a combination ratio of a first precoding matrix corresponding to the index of the first codeword and a second precoding matrix corresponding to the index of the second codeword; and
    generating a transmission precoding matrix by combining the first precoding matrix and the second precoding matrix according to the combination ratio.

9. The method of claim 8, further comprising transmitting a sounding signal, and
    wherein the first codeword is determined by the serving base station based on the sounding signal, and the second codeword is determined by the neighboring base station based on the sounding signal.

10. The method of claim 8, wherein the index of the first codeword is determined by $$\underset{i}{\operatorname{argmax}} \|H_s v_i\|^2,$$

wherein the $H_s$ is a channel between the serving base station and the terminal, and the $v_i$ is a codeword having an index i in a codebook.

11. The method of claim 8, wherein the index of the second codeword is determined by $$\underset{i}{\operatorname{argmin}} \|H_I v_i\|^2,$$

wherein the $H_I$ is a channel between the neighboring base station and the terminal, and the $v_i$ is a codeword having an index i in a codebook.

12. The method of claim 8, wherein the transmission precoding matrix is determined by $$\frac{PCR \cdot W_{PMI_{max}} + (1 - PCR) \cdot W_{PMI_{min}}}{\|PCR \cdot W_{PMI_{max}} + (1 - PCR) \cdot W_{PMI_{min}}\|},$$

wherein the $W_{PMI\ max}$ is the first precoding matrix, the $W_{PMImin}$ is the second precoding matrix, and the PCR is the combination ratio.

13. The method of claim 8, further comprising transmitting a cell specific sounding signal so that the serving base station can select the terminal and the neighboring base station.

14. A precoding control apparatus of a serving base station, comprising:
a neighboring base station cooperation unit that receives an index of a first codeword from a neighboring base station;
a precoding controller that determines an index of a second codeword, and a combination ratio of a precoding matrix corresponding to the index of the first codeword and a precoding matrix corresponding to the index of the second codeword; and
a transceiver that transmits the index of the first codeword, the index of the second codeword, and the combination ratio to the terminal,
wherein the second codeword is a codeword that maximizes a norm of each codeword and a channel between the serving base station and the terminal in a codebook, and
the first codeword is a codeword that minimizes a norm of each codeword and a channel between the neighboring base station and the terminal in the codebook.

15. The apparatus of claim 14, wherein the transceiver receives a sounding signal from the terminal, and
the precoding controller calculates a channel between the serving base station and the terminal based on the sounding signal, and determines the first codeword based on the channel.

16. A precoding apparatus of a terminal, comprising:
a transceiver that receives an index of a first codeword, an index of a second codeword, and a combination ratio of a first precoding matrix corresponding to the index of the first codeword and a second precoding matrix corresponding to the index of the second codeword from a serving base station; and
a precoding unit that generates a transmission precoding matrix by combining the first precoding matrix and the second precoding matrix according to the combination ratio,
wherein the first codeword is a codeword that maximizes a norm of each codeword and a channel between the serving base station and the terminal in a codebook, and
the second codeword is a codeword that minimizes a norm of each codeword and a channel between the neighboring base station and the terminal in the codebook.

17. The apparatus of claim 16, wherein the transmission precoding matrix is determined by $$\frac{PCR \cdot W_{PMI_{max}} + (1 - PCR) \cdot W_{PMI_{min}}}{\|PCR \cdot W_{PMI_{max}} + (1 - PCR) \cdot W_{PMI_{min}}\|},$$

wherein the $W_{PMImax}$ is the first precoding matrix, the $W_{PMImin}$ is the second precoding matrix, and the PCR is the combination ratio.

* * * * *